United States Patent [19]

Taylor

[11] Patent Number: 4,511,663

[45] Date of Patent: Apr. 16, 1985

[54] FIBER-REINFORCED COMPOSITES

[75] Inventor: Mark P. Taylor, Painted Post, N.Y.

[73] Assignee: Corning Glass Works, Corning, N.Y.

[21] Appl. No.: 638,781

[22] Filed: Aug. 9, 1984

[51] Int. Cl.³ .......................... B32B 9/00; D02G 3/00
[52] U.S. Cl. ........................................... 501/4; 501/32;
428/367; 428/408; 428/379; 428/432
[58] Field of Search ............... 428/367, 389, 379, 408,
428/432, 433, 434; 501/32, 4

[56] References Cited

U.S. PATENT DOCUMENTS

| | | | |
|---|---|---|---|
| 4,263,367 | 4/1981 | Preno | 428/389 |
| 4,373,006 | 2/1983 | Galasso et al. | 428/373 |
| 4,460,638 | 7/1984 | Haluska | 428/408 |
| 4,460,639 | 7/1984 | Chi et al. | 428/408 |
| 4,481,249 | 11/1984 | Ebneth et al. | 428/367 |

*Primary Examiner*—Marion E. McCamish
*Assistant Examiner*—B. K. Johnson
*Attorney, Agent, or Firm*—C. S. Janes, Jr.

[57] ABSTRACT

There is disclosed a fiber-reinforced composite having improved mechanical strength and being composed of metal-coated, carbon fibers embodied within a glass or glass-ceramic matrix.

6 Claims, No Drawings

FIBER-REINFORCED COMPOSITES

BACKGROUND OF THE INVENTION

This invention is concerned with composites in which a glass or glass-ceramic matrix is reinforced with carbon fibers embodied therein. It is particularly concerned with such composites wherein the carbon fiber is provided with a metal coating.

Composites, in which ceramic matrices, particularly glass, are provided with carbon or silicon carbide fibers, are described in some detail in the literature. For example, graphite-glass combinations are disclosed in U.S. Pat. Nos. 3,607,608; 3,681,187; 4,256,378; 4,263,367 and 4,265,968. A variety of different glasses is shown, but one, a borosilicate available from Corning Glass Works under Code 7740, is frequently referred to as exemplary.

A basic purpose of fiber reinforcement is improvement of mechanical strength. This is often referred to as bending strength. One of the standard tests involves a three point bend apparatus. The measured data is then converted into, and reported as, modulus of rupture (MOR) in thousands of pounds per square inch (ksi).

PURPOSE OF THE INVENTION

Useful glass-carbon composites have been produced, but there has been a desire to improve on the mechanical strength values attainable. It is then a basic purpose of the invention to produce a stronger glass-carbon composite.

A further purpose is to provide such improved strength without complicating, or significantly altering, the method of embedding the fibers in the matrix.

Another purpose is to provide an improved material bond in a glass-carbon fiber composite.

A further purpose is to provide a composite with a relatively high thermal conductivity to facilitate heat dissipation.

A still further purpose is to enhance electrical conductivity in a composite.

SUMMARY OF THE INVENTION

In furtherance of these and other purposes, my invention is a composite having a glass or glass-ceramic matrix and metal-coated, reinforcing, carbon fibers embodied therein.

The metal coating should be continuous, but may be very thin, e.g. on the order of a few hundredths micron in thickness. It may be applied by electroplating.

The composite may be prepared in conventional manner employing a tow of fibers embedded in a matrix of glass or glass-ceramic with the fibers separated and individually surrounded by matrix. The composite is then subjected to a conventional hot pressing technique.

LITERATURE SURVEY

In addition to the patent disclosures involving graphite-glass composites that were mentioned earlier, reference may also be made to U.S. Pat. Nos. 3,161,473; 3,371,995; 4,314,852 and 4,324,843. These patents disclose composites with a glass or glass-ceramic matrix.

Other U.S. Patents disclosing composites embodying carbon fibers include:

No. 3,674,689 (Giltrow et al.) discloses a bearing component wherein at least the contacting surface is composed of metal-coated, carbon fibers incorporated as reinforcement in a matrix of synthetic resin to provide a low wear rate and low friction.

No. 3,720,257 (Beutler et al.) discloses carbon fibers coated with a metal such as nickel, and incorporated in a melt of a soft metal in a non-oxidizing environment to reinforce the soft metal.

No. 3,807,996 (Sara) discloses a composite having a nickel base metal matrix reinforced with carbon fibers having a thin, intermediate layer of a metal carbide on the fiber surface. The metal carbide is formed by diffusing a second metal through a nickel coating on the carbon fiber.

Nos. 3,702,240 and 3,869,335 (Siefert) disclose an impact resistant composite, consisting essentially of metal coated glass fibers in a matrix of glass or ceramics, and a method of production.

GENERAL DESCRIPTION OF THE INVENTION

The measured strength of carbon-glass composites is consistently less than that predicted by a "rule-of-mixture" calculation. It occurred to me that this might be occasioned by a deficiency in the bonding between carbon and glass or glass-ceramic. The present invention stems from research based on this speculation.

The invention essentially involves using a metal-coated carbon fiber as a reinforcing medium in a glass or glass-ceramic matrix. The metal film appears to present a more compatible bonding surface for the glass or glass-ceramic than does the uncoated carbon fiber.

In the case of uncoated fibers, it is my belief that the silicate matrix is exposed to a highly non-polar surface formed by the Pi-electron cloud of the oriented graphite crystals. This has no tendency to bond with the oxygen in the silicate matrix. The presence of a metal film effectively cancels out this non-polar surface and provides a metallic cation which readily combines with oxygen to form an oxide and a tight bond.

Any readily oxidizable metal should behave in similar manner to provide an effective metal-carbon bond. Thus, I believe any of these metals should be effective: Y, Zr, Nb, Mo, Ag, Cd, Ta, W, Zn, Cu, Co, Fe, Mn, Cr, V, Ti, Sc, Al, Mg, and Ni. In addition, metals which do not readily oxidize, such as platinum and gold, may still be useful where such features as thermal or electrical conductivity are significant.

Metals may be applied by various physical and chemical methods including electroplating and vacuum deposition. Preferably, the metallized fibers are prepared in bundles known as tows. The coating may be very thin as long as it is essentially continuous. In general, films of 0.01 to 1.0 micron are preferred.

The improvements of the invention are not dependent on the glass or glass-ceramic matrix chosen. Thus, any known glass or glass-ceramic matrix material may be employed. For example, the borosilicate glass mentioned earlier, Corning Code 7740, is recognized as an excellent glass.

An effective family of glass-ceramic materials is disclosed in a companion application, also entitled "Fiber-Reinforced Composites", and filed on even date herewith in the names of G. H. Beall, K. Chyung and M. Taylor. These glass-ceramic materials are characterized by a canasite crystal phase when crystallized. As calculated in weight percent on an oxide basis, they are composed of 45–75% $SiO_2$, 8–30% CaO, 3.5–12% F, 3–15% $Na_2O$, 0–20% $K_2O$, 5–25% $Na_2O+K_2O$, 0–6% $B_2O_3$, 0–7% $Al_2O_3$, and 0–12% $ZrO_2$.

Code 7740 glass provides a relatively low expansion matrix. However, for certain applications, especially where thermal shock resistance is critical, even lower coefficients of thermal expansion may be desired. These can be obtained by using glass-ceramics derived from lithium aluminosilicate glasses, especially such glass-ceramics characterized by a beta-quartz crystal phase. Glass-ceramics of particular interest are disclosed in Ser. No. 621,932 filed 6/18/84, in the names of K. Chyung, P. C. Schultz and M. P. Taylor, and entitled "Fiber Reinforced Glass/Glass-Ceramic Mirror Blanks".

In accordance with conventional practice, a melted glass is comminuted to a size of 10–15 microns. The powdered glass is then dispersed in a vehicle. The vehicle may be aqueous, and preferably contains a suspending medium to form a slurry. If a non-aqueous vehicle is desired, propanol is recommended.

The glass slurry and the metal-coated fibers are now brought in intimate association. Preferably, the fibers, in the form of a multi-fiber tow or fabric, are passed through the slurry while being separated to permit intimate intermingling.

The impregnated body may be dried and stored as a prepreg or used directly. In any case, it is cut into desired form for further processing. Normally, the impregnated pieces, as cut from the larger body, are placed in a die and hot pressed. In this procedure, the furnace is pumped down to a low pressure and heated to a predetermined target temperature. Pressure is then applied to the die along a pre-determined schedule to insure complete densification of the matrix and allow for appropriate bonding to the metal coating. Then the composite is cooled and removed.

If the matrix is to be cerammed, that is crystallized in situ, then the composite must be given a suitable heat treating schedule. This may be done as part of the hot pressing schedule, or as a separate step. In any case, an inert atmosphere is preferred to prevent oxidation of the fibers. The sample may then be finished for strength testing. This may, for example, be performed by mounting in a threepoint bending apparatus and loading to destruction.

SPECIFIC DESCRIPTION

By way of further illustration of the invention, reference is made to studies carried out employing both glass and glass-ceramic matrix materials, and both nickel-coated and uncoated carbon fibers.

The two glasses employed are shown in terms of composition of Table 1 below. Glass A is Corning's Code 7740, while glass B is a crystallizable glass within which a canasite crystal phase can be developed by suitable heat treatment. This glass was selected from those disclosed in the companion application mentioned earlier. Both compositions are in parts by weight, but approximate percentages.

TABLE I

|  | A | B |
|---|---|---|
| $SiO_2$ | 81 | 52 |
| $B_2O_3$ | 13 | — |
| $Al_2O_3$ | 2 | — |
| $ZrO_2$ | — | 6 |
| CaO | — | 12 |
| $CaF_2$ | — | 14 |
| $K_2O$ | — | 9 |
| $Na_2O$ | 4 | 7 |

The uncoated fiber employed was a standard graphite fiber supplied in the form of a multifiber tow by Hercules Inc. under their name Hercules HMS. The coated fiber was one prepared by Electrometalloid of Irvington, N.Y. It was a standard graphite fiber having a 0.5 micron thick film of nickel applied by electroplating. This was supplied as a continuous 12K tow.

The fibers had these reported intrinsic properties:

|  | UTS (Kpsi) | Density (g/cm$^3$) | Modulus (Mpsi) |
|---|---|---|---|
| Graphite (Hercules HMS) | 340 | 1.83 | 53 |
| Graphite (Ni-Coated) | 460 | 2.35 | 34 |

UTS = Ultimate Tensile Strength

Each multi-fiber tow or mat was introduced into a tank containing a slurry of glass powder suspended in an aqueous vehicle containing organic binders and plasticizers. A typical slurry contained 800 grams of vehicle solution, and 325 grams of glass. As the fiber mass passed through the slurry, it became thoroughly impregnated with powdered glass, a typical sample being approximately half glass and half fiber when dried.

The impregnated yarn was wound on a film-covered square drum and dried overnight. The prepregs thus produced could either be stored in plastic bags, or immediately cut to the size and shape desired for pressing.

Disks with diameters slightly under 3" were cut from the prepreg mat. Ten disks were then stacked in a 3" I.D.×4" O.D. graphite mold with their fiber directions as closely aligned as possible. Mo-foil disks were placed top and bottom to protect the composite from the graphite die. The volatiles were burned out by heating the loaded molds to 300° C. in an inert atmosphere.

Consolidation was carried out in a Centorr vacuum hot press equipped with tungsten wire mesh elements which formed a 4½" diameter hot zone. The die was supported on a 2" graphite rod. Pressure was applied from a second graphite rod connected to an hydraulic ram above the furnace. Furnace temperatures were measured on a W5%Re vs W26%Re thermocouple located approximately 1 cm from the mold surface. Pressures were calculated from the hydraulic pressure gauge.

A typical run was as follows:
(1) Load die hot zone and apply 368 psi holding pressure. Pump chamber to $1 \times 10^{-4}$ torr.
(2) Heat the chamber to 650° C. as fast an outgassing will allow. This can be as fast as 30° C./min if the molds are stored in a drying oven before use. The highest tolerable pressure is $8 \times 10^{-4}$ torr. Hold 15 minutes to allow outgassing.
(3) Heat to maximum temperature at 5° C./min. This rate is about as fast as outgassing will allow.
(4) Apply 1500 psi pressure at the target temperature.
(5) Hold at maximum temperature for 30 minutes. Most ram movement takes place over a few minutes when the glass reaches a viscosity of about $10^9$, but the composite may not consolidate well at the center of the disk without the hold. This is especially true at minimum pressing temperatures.
(6) Shut off furnace power and back-fill with Ar gas to speed cooling.

The foregoing does not represent critical conditions, and should be regarded as essentially exemplary. For example, after step (1), the operation might be carried out in a nitrogen atmosphere, rather than under vacuum. Likewise, tungsten heating elements may be replaced by graphite, or other, heating elements.

It had previously been demonstrated that hot pressing at a matrix viscosity of $10^6$ poises provided good fiber separation and densification. The temperature corresponding to $10^6$ poises for Code 7740 was 1095° C., and that for the canasite glass (Glass B) was 733° C. Accordingly, these were taken as target temperatures in the hot pressing operations.

The composites were ground flat and parallel with 325 grit medium, then cut into mechanical test specimens measuring 2.5"×0.18×0.10". The uncoated graphite/7740 specimen was somewhat thinner due to an overflash of material during hot pressing. Strengths were measured in a three point bend apparatus with a span of 1.5 inches.

The bending test data, as converted to MOR in Kpsi, and the observed condition of the sample break are recorded in Table II below:

TABLE II

| Sample | Matrix | MOR (Kpsi) | Fracture |
| --- | --- | --- | --- |
| Uncoated | 7740 | 76.5 | Brittle, explosive |
| Coated | 7740 | 108 | Brushy, splintered |
| Uncoated | Canasite | 29.0 | Brushy, splintered |
| Coated | Canasite | 84.9 | Brushy |

I claim:
1. A fiber-reinforced composite having an improved mechanical strength and being composed of metal-coated, carbon fibers embodied within a glass or glass-ceramic matrix.
2. A composite in accordance with claim 1 wherein the metal coating is 0.01 to 1.0 micron thick.
3. A composite in accordance with claim 1 wherein the carbon fibers have a nickel coating.
4. A composite in accordance with claim 1 wherein the matrix is a glass.
5. A composite in accordance with claim 1 wherein the matrix is a crystallized glass-ceramic.
6. The composite of claim 5 wherein the glass-ceramic has a beta-quartz crystal phase.

* * * * *